United States Patent [19]
Babbitt et al.

[11] Patent Number: 6,009,161
[45] Date of Patent: Dec. 28, 1999

[54] AUTOMATED RINGING OF AN OPERATOR FOR DIRECTORY ASSISTANCE CALLS

[75] Inventors: Bradley Babbitt; John H. Krebs, both of Pittsburgh, Pa.; Mary K. Kubli, Neptune, N.J.

[73] Assignee: AT&T Corp, New York, N.Y.

[21] Appl. No.: 08/907,447

[22] Filed: Aug. 8, 1997

[51] Int. Cl.⁶ .............................. H04M 3/22; H04M 3/48; H04M 3/60
[52] U.S. Cl. ......................... 379/264; 379/209; 379/218; 379/260; 379/308
[58] Field of Search ..................................... 379/209, 218, 379/260, 261, 262, 263, 264, 265, 266, 267, 308, 309, 310, 311

[56] References Cited

U.S. PATENT DOCUMENTS

| | | | |
|---|---|---|---|
| 4,620,066 | 10/1986 | Bushnell et al. | 379/266 X |
| 4,656,624 | 4/1987 | Collins et al. | 379/265 X |
| 4,899,375 | 2/1990 | Bauer et al. | 379/260 X |
| 5,311,574 | 5/1994 | Livanos | 379/209 X |

*Primary Examiner*—Harry S. Hong

[57] ABSTRACT

A method of completing a call to a remote directory assistance operator comprises the steps of attempting to place the call and disconnecting an operator position manned by a live operator from the call. Once the operator is disconnected, the call is supervised for a remote answer and a time-out clock started. In the event of a call to a remote directory assistance operator whose country or region is notorious for not answering their phone lines, the time of the attendant operator in supervising the call is saved during the automatic answer supervision period. Periodic announcements may be provided the caller over time and new services offered by these periodic announcements. For example, in one embodiment, the user is offered the opportunity to place the call at a predetermined callback time in the future when the call may be more likely to succeed. In yet other embodiments, the call to the remote directory assistance operator may be queued with other such requests for directory assistance, responses to requests in the queue obtained and each user called back at their requested callback time (or in advance thereof) with the requested information. Automated prompts/announcements may be made in a preselected language of choice to the user or to the remote directory assistance operator.

18 Claims, 3 Drawing Sheets

| | |
|---|---|
| 1. CALL ARRIVES AT CIDA OSP AND CIDA OPERATOR ENTERS ALL CALL DATA. | 400 |
| 2. CUSTOMER REQUESTS IDA TO AN AIR ELIGIBLE COUNTRY SO OPERATOR PRESSES AIR KEY AND ENTERS ALL AIR INFORMATION. | 410 |
| 3. CIDA OSP SOFTWARE PLACES A CALL TO THE FOREIGN DA OPERATOR AND BRIDGES THE AIR AUTOMATED VOICE POSITION (AIR AVP) ONTO THE CALL. | 420 |
| 4. CIDA OSP WRITES RECORD TO AIRDELAY DATABASE WITH THE RELAUNCH TIME SPECIFIED IN THE CASE OF NO ANSWER FROM FOREIGN DA. AT THIS TIME, THE CALL IS "FLOATING," WAITING FOR THE TIMEOUT OR AN ANSWER FROM THE FOREIGN DA OPERATOR. | 430 |
| 5. AIR AVP PLAYS RECORDING EVERY X SECONDS "PLEASE HOLD WHILE WE TRY TO CONTACT THE FOREIGN OPERATOR." | 440 |
| 6. MCP CONSTANTLY MONITORS THE CALL FOR ANSWER SUPERVISION FROM THE FOREIGN DA OPERATOR. | 450 |
| 7. AIR DBF CONSTANTLY MONITORS CALL CHECKING FOR THE EXPIRATION OF THE TIMEOUT TIME. | 460 |
| 8. IF FOREIGN DA OPERATOR ANSWER, THE MCP SENDS A MESSAGE TO THE DBF TO IMMEDIATELY RELAUNCH THE CALL TO A CIDA OPERATOR | 470 |
| 9. DBF WRITES "00:00:00" FOR RELAUNCH TIME IN AIRDELAY DATABASE. | 480 |
| 10. AIR DBF SEES THAT THE TIME HAS EXPIRED (EITHER BECAUSE FOREIGN DA ANSWER OR TIMEOUT) AND ISSUES A REQUEST TO DROP THE AIR AVP AND THEN ISSUES A REQUEST TO CONFERENCE A CIDA OSP. | 490 |
| 11. CALL ARRIVES BACK AT A CIDA OSP. THE SCREEN TELLS THE OPERATOR WHETHER THE CALL WAS ANSWERED BY FOREIGN DA OPERATOR OR NOT. IF THE FOREIGN DA OPERATOR HAS ANSWERED, THE CIDA OPERATOR OBTAINS THE LISTING FOR THE CUSTOMER AND THE CALL IS BILLED. IF THERE IS NO ANSWER, THE CIDA OPERATOR ASKS THE CUSTOMER IF THEY WOULD LIKE TO MAKE ANOTHER ATTEMPT (ASSUMING THE MAXIMUM NUMBER OF ATTEMPTS HAVE NOT BEEN EXCEEDED). | 500 |

FIG. 4

| | |
|---|---|
| 1. CALL ARRIVES AT CIDA OSP AND CIDA OPERATOR ENTERS ALL CALL DATA. | 400 |
| 2. CUSTOMER REQUESTS IDA TO AN AIR ELIGIBLE COUNTRY SO OPERATOR PRESSES AIR KEY AND ENTERS ALL AIR INFORMATION. | 410 |
| 3. CIDA OSP SOFTWARE PLACES A CALL TO THE FOREIGN DA OPERATOR AND BRIDGES THE AIR AUTOMATED VOICE POSITION (AIR AVP) ONTO THE CALL. | 420 |
| 4. CIDA OSP WRITES RECORD TO AIRDELAY DATABASE WITH THE RELAUNCH TIME SPECIFIED IN THE CASE OF NO ANSWER FROM FOREIGN DA. AT THIS TIME, THE CALL IS "FLOATING," WAITING FOR THE TIMEOUT OR AN ANSWER FROM THE FOREIGN DA OPERATOR. | 430 |
| 5. AIR AVP PLAYS RECORDING EVERY X SECONDS "PLEASE HOLD WHILE WE TRY TO CONTACT THE FOREIGN OPERATOR." | 440 |
| 6. MCP CONSTANTLY MONITORS THE CALL FOR ANSWER SUPERVISION FROM THE FOREIGN DA OPERATOR. | 450 |
| 7. AIR DBF CONSTANTLY MONITORS CALL CHECKING FOR THE EXPIRATION OF THE TIMEOUT TIME. | 460 |
| 8. IF FOREIGN DA OPERATOR ANSWER, THE MCP SENDS A MESSAGE TO THE DBF TO IMMEDIATELY RELAUNCH THE CALL TO A CIDA OPERATOR | 470 |
| 9. DBF WRITES "00:00:00" FOR RELAUNCH TIME IN AIRDELAY DATABASE. | 480 |
| 10. AIR DBF SEES THAT THE TIME HAS EXPIRED (EITHER BECAUSE FOREIGN DA ANSWER OR TIMEOUT) AND ISSUES A REQUEST TO DROP THE AIR AVP AND THEN ISSUES A REQUEST TO CONFERENCE A CIDA OSP. | 490 |
| 11. CALL ARRIVES BACK AT A CIDA OSP. THE SCREEN TELLS THE OPERATOR WHETHER THE CALL WAS ANSWERED BY FOREIGN DA OPERATOR OR NOT. IF THE FOREIGN DA OPERATOR HAS ANSWERED, THE CIDA OPERATOR OBTAINS THE LISTING FOR THE CUSTOMER AND THE CALL IS BILLED. IF THERE IS NO ANSWER, THE CIDA OPERATOR ASKS THE CUSTOMER IF THEY WOULD LIKE TO MAKE ANOTHER ATTEMPT (ASSUMING THE MAXIMUM NUMBER OF ATTEMPTS HAVE NOT BEEN EXCEEDED). | 500 |

AUTOMATED RINGING OF AN OPERATOR FOR DIRECTORY ASSISTANCE CALLS

BACKGROUND OF THE INVENTION

1. Technical Field

The present invention relates to the field of telecommunications directory assistance and, more particularly, to the processing of a call between a first operator and a second, remote directory assistance operator, to assist a caller to obtain a telephone number or related signaling address without consuming the first operator's time.

2. Description of the Related Arts

Directory assistance is provided by telecommunications operators from typically specialized operator service position systems. Many of these services are automated and implemented through automated prompting and speech recognition systems known in the art. For example, in a typical directory assistance call in the United States, a caller dials 411 for a local exchange area and receives a pre-recorded prompt "Directory assistance: For what city please;" then once the city is voiced, there is a prompt: "For what listing;" and in response to the prompt and depending on the response the caller gives, a live operator need not intervene in the call. A desired telephone number is announced through a speech synthesized announcement. Moreover, the call may be completed to that number without redialing according to a known service offering. Long distance directory assistance may be provided in a similar manner, the difference being the access telephone number or address dialed, typically comprising an area code for a local exchange area, followed by a predetermined telephone number 555-1212.

Not all directory assistance is automated, however. Also, for example, in less sophisticated regions of the United States or in trying to reach international directory assistance, live operator assistance is often needed, if not required. For example, in a call to a carrier providing a manual directory assistance, the telephone positions of live directory assistance operators may ring and ring with no response. A live operator, intervening in the call to the ringing telephone line, may be tied up during the call along with the calling party for many seconds.

In an international call, and referring to FIG. 1, a customer 10 who is interested in obtaining a telephone number of an international party typically dials "0-0" in the United States to reach a long distance operator at operator services position system 30, typically associated with an end office 20. When the customer 10 asks for directory assistance in a remote country, for example, India, the long distance operator may transfer the call to a centralized international directory assistance position 40 for a chosen carrier, for example, AT&T, who will attempt to reach India directory assistance, represented in the drawing as foreign country directory assistance FCDA1 for a first country, 60-1, FCDAn for a country n, 60-n, where country n may be France, Japan, India or any foreign country the caller desires. Gateway switch 50 represents an international gateway switching center to a foreign country which typically comprises a #4ESS :system available from Lucent Technologies or other electronic toll switch known in the art. In the United States, other carriers than AT&T may not provide a centralized international directory assistance position and the long distance operator may attempt a call to a foreign directory assistance position from dispersed toll or tandem offices in the long distance carrier served region.

Assuming either case, the live operator typically records the caller's desired information in a database (what country? what city? what listing?) and must personally supervise the call to foreign directory assistance for an answer. The telephone line to the foreign directory assistance operator may ring and ring with no answer. Both the caller and the live operator may become annoyed. After a predetermined time interval, for example, 60 seconds, the operator may tell the customer that there is no answer and they must try again later. While the customer is not charged for the call, the customer may have spent as much as 3 to 4 minutes attempting to make the call while the long distance carrier or carriers have incurred costs in attempting the connection and in operator time supervising the ring-no-answer with no revenue in return.

It is well known in the art to mechanize or automate portions of a directory assistance call, a collect call (for example, verification of the collect call) and even to automate and centralize features and functionalities, for example, via the so-called More Efficient Call Handling project for automating AT&T Operator Services initiated in the 1990's. Yet, there remains a need in the art to more efficiently provide directory assistance information in the event of a directory assistance call to a remote region of the United States or in an international call for directory assistance. By an international or intercontinental call is intended herein a call to an area outside of the so-called North American Numbering Plan which is typically represented by a telephone number of the format NPA-NXX-XXXX, where NPA is typically referred to as an area code. Moreover, it is an object of the present invention to save operator time in supervising a directory assistance call. Also, it is an object of the present invention to save the caller's time in placing a directory assistance call. Through the caller's saving time and further being able to receive service more quickly, customer satisfaction is improved. Finally, through the greater liklihood that a call will go through to obtain both directory assistance and to ultimately connect to a called party, revenues to the service provider will increase.

SUMMARY OF THE INVENTION

According to the principles of the present invention, a directory assistance operator position is associated with remote answer supervision for supervising for answer by a remote directory assistance operator. The directory assistance operator position so equipped may be further associated with a switch or other actuation means for holding the call so that the directory assistance operator may attend to other directory assistance calls. A first pre-determined period of time may lapse and the caller may receive an automated or live operator announcement/prompt, for example, "The remote directory assistance position is not answering; do you want to continue ringing?" A second and third predetermined period of time may lapse and similar intervention, manual or automated provided, but in any event, considerable live operator time is saved in having to supervise for remote operator answer.

In further embodiments of the invention, further automated announcement/prompts may be implemented. For example, an automated redial may be actuated for a later time or periodically over periods of time. The prompt may comprise the following: "The foreign directory assistance operator is not answering; press or say -1- to redial the foreign operator; press or say -2- to speak to your long distance operator or hang up and try your call again later." In regard to continuing to serve the caller, the caller data such as name of listing and city/country may be recorded and associated with the caller's telephone number and when an answer is obtained from the foreign operator, the caller may be rung back and provided the desired telephone number personally by a live long distance operator or in automated form by a speech synthesized or pre-recorded announcement.

Thus, through implementation of the present invention to provide directory assistance, the above-stated objectives may be met of saving operator time, saving caller time, increasing revenue sources for international toll services and increasing customer satisfaction with the improved service and saving of time.

These and other features of the present invention may become clearer from understanding the following detailed description of the present invention as explained with reference to the accompanying drawings.

BRIEF DESCRIPTION OF THE DRAWINGS

FIG. 4 is a flow diagram for describing the processing of a call to a directory assistance operator, minimizing long distance operator supervision time, in accordance with the present invention.

DETAILED DESCRIPTION

Figure 1:
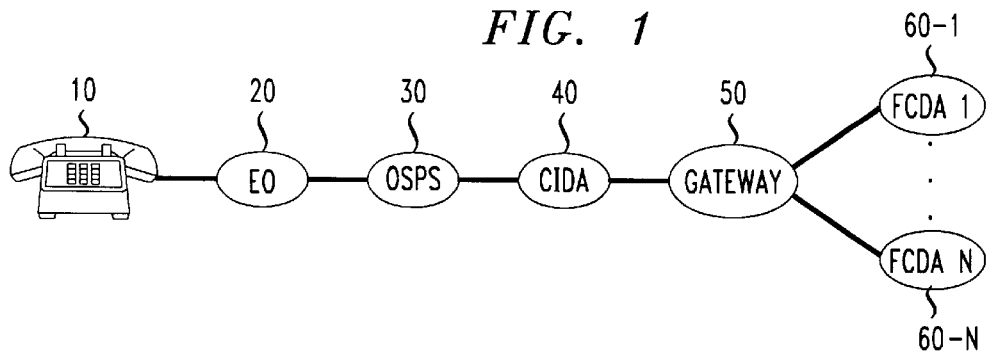
FIG. 1 is a network diagram for describing the process of a typical call in connection with prior art processes as well as with the processes of the present invention.

Referring first to FIG. 1, a network diagram is provided for describing the process of a typical call for international directory assistance in connection with a discussion of prior art directory assistance processes as well as for describing the present invention. One principle of the present invention is the principle of minimizing or altogether eliminating operator supervision time in obtaining directory assistance from a remote directory assistance operator. This principle may apply to the completion of an intra-country call as well as an international directory assistance call and the present invention should not be construed to be limited to an international call, used by way of example to describe the present invention.

Thus, in accordance with typical known processes, a caller from a telephone 10 may dial the digit -0- and request to be connected via a live operator to directory assistance in an unsophisticated region of the country, may dial -0-0- for an international operator or, otherwise, request a live operator to intervene in a directory assistance call. In an international call, depending on the common carrier, there may be decentralized operator position systems (not shown) or centralized operator position systems for assisting with the call. When the digits are dialed calling in an operator, an end office 20 is alerted and connects to operator service position system 30 which may be automated or manual. The OSPS 30 calls in, for example, a centralized directory assistance position, CIDA 40. In an international call, the operator at CIDA 40 attempts to reach a foreign directory assistance operator via an international gateway switch 50. The foreign country directory assistance operator may be identified typically by country code and telephone number to the switch which connects to a selected country destination, 1 of n possible destination countries. France, for example, may be represented as FCDA1 and denoted 60-1 while India may be represented as FCDAn and denoted 60-n.

A problem which the present invention attempts to alleviate is that certain foreign country and other remote destination directory assistance operator assistance positions are notoriously slow in answering their calls. The caller, requesting a telephone number, may have to wait several minutes waiting for an answer. Any live operator servicing the call may be likewise inconvenienced. The down time for the customer and for the operator may cost both lost time and loss of revenues.

In accordance with the present invention, and as will be further described in detail in connection with a discussion of FIGS. 3 and 4, the live operator at OSPS 30 may actuate a means of automatically supervising the call to the remote directory assistance operator position. Moreover, the supervision may further include the step of timing the duration of the ringing, no answer condition for a predetermined period of time, for example, 60 seconds. At the completion of the interval, the call may be automatically or manually (by a live operator) to announce that the call has been completed to the remote directory assistance position but the operator is not answering. The announcement may further prompt for an indication of whether the caller wants to continue to listen for an answer or if they wish to actuate other features as will be described further herein. Thus, in accordance with the present invention, operator time is saved. Moreover, according to the further features that will be described herein, for example, offering to automatically and periodically continue to place calls to the directory assistance operator and monitor for answer, the caller can be alerted when the call finally goes through, thus saving the caller considerable time and effort.

Figure 2:
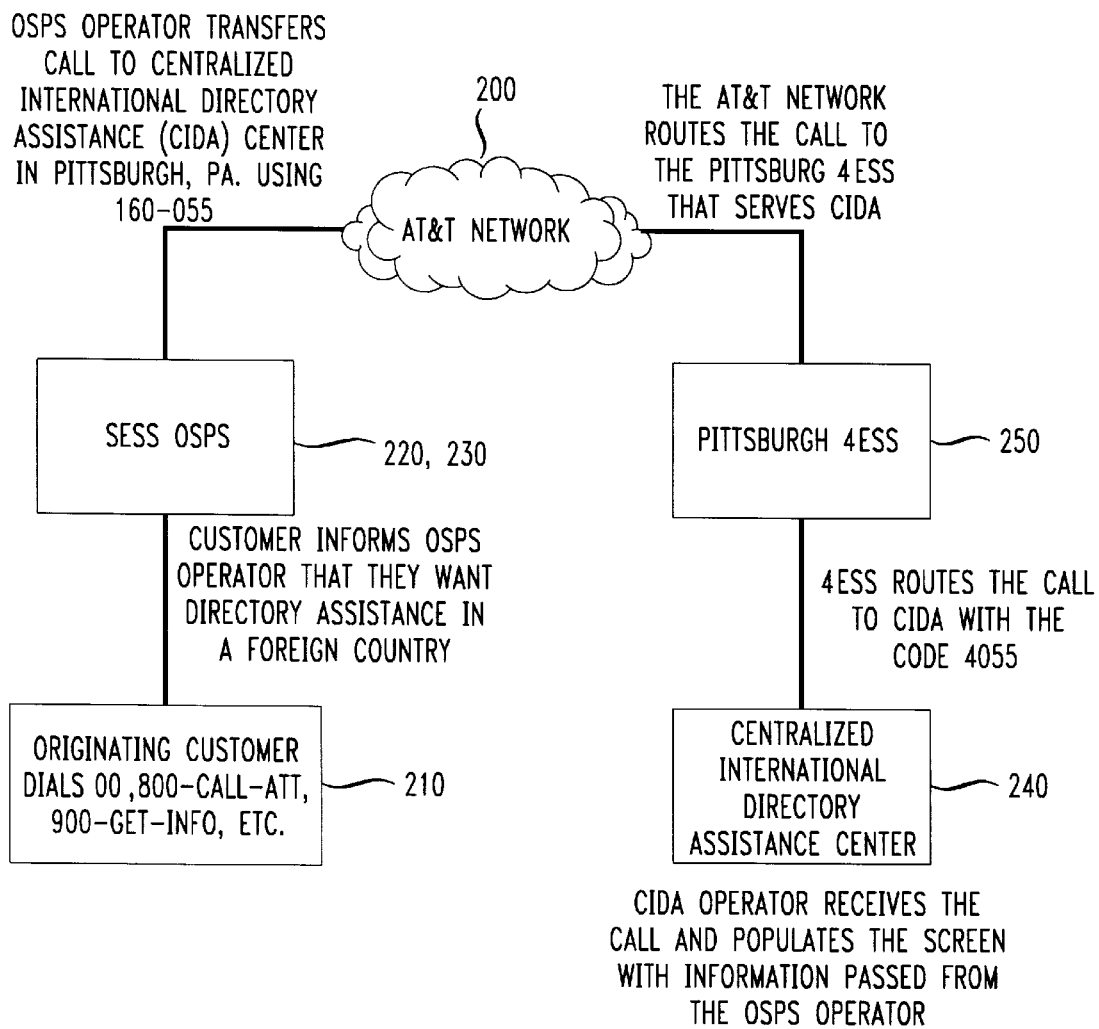
FIG. 2 is a further network diagram showing an arrangement for providing centralized international directory assistance services in the AT&T toll network where such services are provided in association with the Pittsburgh, Pa., toll switch, a #4 Electronic Switching System, manufactured by Lucent Technologies.

Now referring to FIG. 2, a typical operator assistance arrangement is described involving the toll network provided by the American Telephone and Telegraph Company, now, commonly known as AT&T. At least the last two digits of reference numerals used in the drawings denote similar elements in the figures. For example, the calling party 10 in FIG. 1 is denoted originating customer 210 in AT&T drawing FIG. 2. FIG. 2 may be used to describe, by way of example, a typical call to a centralized long distance operator for directory assistance services up until the time automated call supervision is provided in accordance with the present invention and described further in FIGS. 3 and 4.

An originating customer typically dials -0- for a live operator or in an AT&T system dials -0-0- or 1-800-CALL-ATT. The originating customer may also dial 1-900-GET-INFO or other telephone number to obtain a live or automated directory assistance operator.

Typically, the customer is connected to an end office, which may be a #5ESS electronic switching system manufactured by Lucent Technologies or other local switch. The end office receives the dialed digit or digits and transfers the call to ring an associated operator service position system (OSPS) provided by the local exchange carrier 220, 230. The customer may then inform the OSPS operator that they want directory assistance for a foreign country in the present international directory assistance call example. The OSPS operator then transfers the customer call to centralized International Directory Assistance 240 via the AT&T Toll Network 200. Network 200 (represented by a cloud in the drawing) may represent connections through a plurality of tandem or toll offices to Pittsburgh, Pa., where is located an international gateway switch 250, for example, comprising a #4ESS electronic switching system manufactured by Lucent Technologies. Code 4055, as sued in the drawing, refers to a short hand call code for defining a type of call. In response to receipt of such a call code, a #4ESS can read the short hand code and using a translation table, understand the call type and operate accordingly, for example, for an interantional directory assistance call. Associated with the #4ESS switch in Pittsburgh in the AT&T network is a centralized International Directory Assistance Center 240 whose architecture will be further described in reference to FIG. 3. The 44ESS routed the call to CIDA 240 with the code 4055. At CIDA center 240, a CIDA operator receives the call and populates a screen of their terminal with information passed from the OSPS operator or via the network, for example, calling party identification, for example, provided by automatic number identification and destination directory assistance request information, for example, the destination country of interest.

Figure 3:
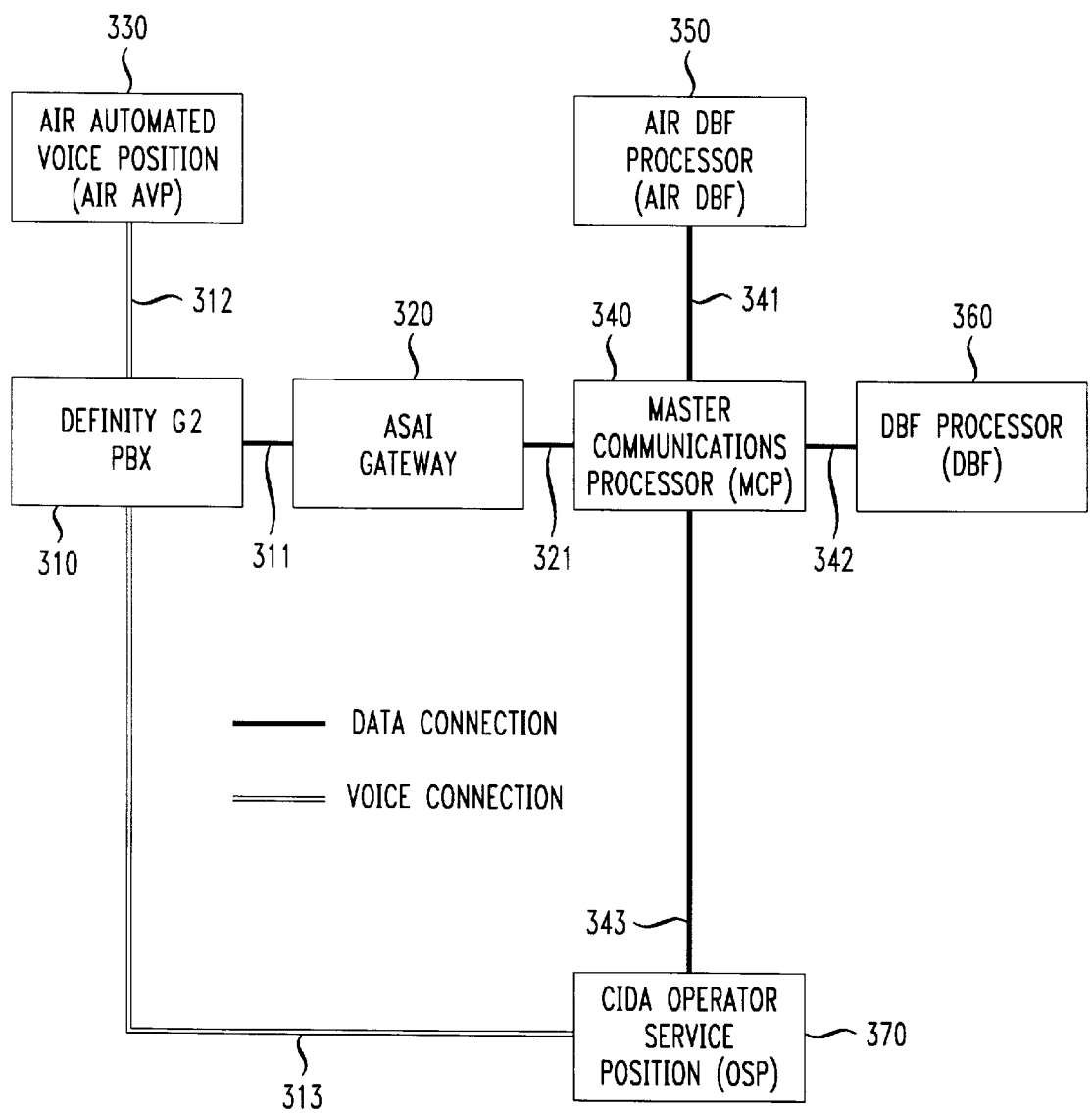
FIG. 3 is a functional schematic block diagram of a centralized operator services position system for providing automated operator ringing in accordance with the present invention.

Referring now to FIG. 3, the structure of a centralized international directory assistance center 240 will be described in some detail. The international gateway switch 250 communicates with a private branch exchange 310 or other small switch known in the art such as a Definity G2 or G3 private branch exchange manufactured by Lucent Technologies. The small switch 310 comprises output data line 311, preferably of optical fiber for high communication bandwidth, to an adjunct switch application interface (ASAI) gateway 320, for example, a 3B2 processor manufactured by AT&T Technologies, now Lucent Technologies, Inc. to a master communications processor (MCP) 340, for example, a UNIX based personal computer. A high bandwidth data link 321 is also provided from ASAI gateway 320 to MCP 340. Voice connections 312 and 313 are provided to plural automated voice or operator positions 330 and 370, of which only one each are shown. The automated voice position 330 is equipped with pre-recorded or speech synthesized announcement/prompt capability and speech recognition means for receiving and interpreting a vocabulary of responses. The private branch exchange thus connects to whatever processing resources are needed for a call. There are four main processing resources which may be the destination of a call: AIR AVP 330, AIR DBF 350, DBF 360 and OSP 370. AIR is an acronym which refers to automated international ringing. The acronym AVP refers to automated voice processing where prompts/announcements are made without a live operator and the acronym DBF refers to a database processor. Three of these processing components, AIR DBF 350, DBF 360 and OSP 370, are connected to a call via the master communications processor 340 which receives and distributes data, for example, between operator positions within CIDA 240 and outside, such as from OSPS 220, 230 in FIG. 2. The data is distributed as needed by MCP 340, for example, via Ethernet data links 341, 342 and 343.

Each live operator service position (OSP) 370 comprises typically a personal computer with a display screen, memory and a keyboard (not shown). In one embodiment, call processing software is located on this personal computer 370 and call processing controled by the attendant. The operator positions 370 are all linked together through the MCP 342 and share data as appropriate with other processors. For example, the AIR DBF processor 360, in accordance with the present invention, monitors a ringing interval for the passage of a predetermined time increment, for example, 60 seconds and, via MCP 340, initiates the connection of AIR AVP 330 or CIDA operator service position 370 to the call, for example, to indicate to the user that, while the call has been completed to the remote directory assistance operator, they are not answering and suggest alternatives to the user as will be further described herein. Thus, for the purposes of the present invention, AIR DBF 350 and DBF Processor 360 may comprise timing programs and clocks for timing intervals and the like as will be further described herein.

Now, referring to the call flow diagram of FIG. 4, the present invention will be further described in detail with reference made to the architectural arrangement of the CIDA 240 of the present invention shown in FIG. 3. Briefly referring to FIG. 2, the call arrives via the international gateway toll switch 250 at Definity PBX 3 10 (FIG. 3) which connects the call to CIDA Operator Service Position 370. In typical automatic call distribution operation, the OSP position 370 is selected as the first available operator position when all positions are presently busy or from a queue of available (free) operator positions as the next available position, for example, in a FIFO queue. Now in FIG. 4, step 410 relates to the arrival of the call at selected, free OSP 370 manned by a live operator. The operator answers the call and records further information about the customers request that can be stored for use later in the call. For example, the display screen may comprise, already, data representing the country of choice, the calling party's telephone number and other data. Of course, if any useful information is missing, it may be entered by the live operator of OSP 370.

Step 410 represents the next step in the call processing path—also involving OSP 370 and its attendant operator. The customer may request international directory assistance (IDA) for a automated international ringing (AIR) eligible country. By this is intended the fact that the present invention may be suitable for implementation for calls to some countries and not others. Of course, the most eligible or desirable countries will be those with the slowest response time for answering a call. Step 410 also includes the attendant operators' actuation of AIR. This actuation may comprise a clicking on a computer screen, actuating a voice or electronic or soft (software) switch or other actuation. Preferably in conjunction with the switch actuation, the operator enters any AIR information required such as name of city and listing and other data useful for the remote international directory assistance operator or future local operators at positions 370 that may be subsequently involved in the call.

At step 420, software associated with the OSP 370 receives the keyed in information and automatically places a call to the desired foreign DA operator. Of course, in order to do so, the Definity switch 310 is triggered to actuate connections via gateway switch 250 to the foreign DA operator. Once the call is placed, and in accordance with the present invention, the operator may drop off the call. The call is bridged to the AIR automated voice position 330 equipped with answer supervision logic.

At step 430, the OSP 370 writes a record of what has happened to a shared AIR DELAY database, which may be associated with MCP 342 or distributed within one or another processing unit. A predetermined relaunch time may be specified in the call log and shared with the customer before the operator releases the call. The relaunch time is specified in the event of a ring/no answer condition or status that can occur in the call attempt to the foreign directory assistance operator. For example, the operator may announce that they are going off the call for a period of 60 seconds or more. Of course, if the foreign operator immediately answers, there is no need for logging off the call. By launch and relaunch is intended herein the event of initiating a new call to a foreign directory assistance position that is AIR eligible or may refer to the opportunity to connect to a new live or automated attendant who (or which) is asked to join a call in progress. The setting of launch timers may be useful as will be further described herein for making announcements and offering new or additional services to assist the caller (who may be frustrated making the call) as will be further described herein. At this time, the call status is that the calling party hears the switched through connection to the other end and ringing but there is no live operator on the line with the customer. "Floating" as used herein refers to that condition or status of a call where no live operator is monitoring for answer supervision. Remote, automated answer supervision is provided by the switch 310 or any connected processor so coupled for monitoring answer supervision including, but not limited to MCP 340. For example, since one or the other DBF processor 350, 360 is involved in timing the length of ringing, processor 350 or 360 may provide answer supervision in a known manner in the alternative to MCP 340. DBF processor 350, 360 then awaits the expiration of a timeout period, for example, 60 seconds, or the answer by the remote directory assistance operator.

Now at step 440, AIR AVP 330 is connected to the call when the time-out period lapses and the remote operator has not yet answered. In one embodiment of the present invention, a pre-recorded announcement may be periodically played: "Please hold while we try to contact the foreign operator." This serves the purpose of letting the customer know that 1) the connection is being attempted via the international gateway switch 250 and 2) that the call is being monitored for answer supervision.

At step 450, MCP 340 continues to monitor and constantly monitors the call for answer supervision. At any time the answer is detected, then, call progress switches the call to live OSP 370. Otherwise, the call flow of FIG. 4 continues.

At step 460, and by way of example, AIR DBF 350 constantly monitors the call, checking for the expiration of a time-out period, for example, if the line is still ringing. If a new time-out period is expired, then, the message played at AVP 330 may change to "while we continue to try to contact . . . "

Step 470 represents what occurs in the event of an answer by the foreign directory assistance operator. If the foreign directory assistance operator finally answers, the MCP 340 sends a message to the DBF 350,360 to immediately relaunch the call to the next available live CIDA operator at a free position 370. Of course, all previously stored call information will be provided on the screen to the attendant at that selected OSP 370.

Step 480 represents DBF 350 or 360 writing into memory of a new relaunch time (resets the clock) to 00:00:00 in an AIR DELAY database. An event, for example, of the foreign directory assistance operator having to ring another operator or place the caller on hold is not unknown.

At step 490, AIR DBF 350 sees that a longer, overall duration timer has expired (for example, because the foreign directory assistance operator has still not answered or the longer time-out interval has lapsed) and issues a request to drop the AIR AVP 330 (for example, after an interval between one and five minutes, or for example, in one embodiment, after an interval of two to two and a half minutes has lapsed of ringing no answer). Another request is made to conference a live operator attendant 370 who can further assist the caller. The operator may offer to continue to place the call and call the caller back when completed, thus saving the caller time. As will be further described herein, such a service may be automated in accordance with one embodiment of the present invention.

In step 500, the caller is connected back to OSP 370 via switch 310. The attendant may refer to the display screen of their operator position for immediate call status information. The screen, for example, tells the attendant whether the call has been answered by the foreign directory assistance operator or whether the call is still be monitored for answer supervision (or call hold supervision as will be further discussed herein). It may also indicate how many attempts have already been made to reach the foreign operator. If the foreign directory assistance operator has finally answered, the CIDA operator obtains the listing for the customer and the call is billed to the customer. If there is no answer still, the CIDA operator may offer optional services to the calling party, for example, the operator may suggest that they make another attempt by initiating a new call to the foreign operator via the gateway. A new call may involve a new link and be successful when the first link was not. A predetermined number of attempts, once exceeded, may cause the operator to suggest still other courses of action for the caller. Again, as will be suggested further herein, some or all of these services may be automated.

Now, these further services will be suggested with reference to FIG. 3 as well. In particular, it may be advantageous to utilize the AVP 330 as much as possible. For example, in one embodiment of the present invention, during answer supervision, the number of times the answer supervision timer has lapsed can result in different and varied announcements output by AVP 330. For example, such an automated conversant may announce: "The foreign operator is not answering. Press or say one to actuate a new redial of the foreign operator now, press or say two to speak to an AT&T operator about other alternatives or hang up and try your call again later.

In a still further embodiment, a reservation may be made for a time in the future when a call may be automatically placed to both the foreign operator and the caller. For example, the time of day may be announced to the caller of the present time in the foreign country and the caller may calculate a more convenient time when it is more likely that an operator would be available to answer the call. In another embodiment, the announcement may be "The foreign directory assistance operator is not answering. Press or say one to redial the operator now, press or say two to arrange for a callback from an AT&T operator." In response to two, further prompts/announcements may suggest the best time of day to reach an operator, prompt for a callback time and the like. A queue of directory assistance requests for directory assistance by a particular foreign directory assistance operator may be formed in memory of MCP 340. The queue may comprise requests of a plurality of callers whose responses can all be obtained at once. Each response can be entered into memory for a requesting caller. At the prearranged time of callback, a live operator may deliver the requested information to the caller that has been stored in memory. In alternative embodiments, the responses may be provided to a user by facsimile or facsimile or other data connection to a personal computer or transmitted via the Internet or E-Mail or left in voice-mail or other voice messaging system or service.

Also, the present invention should not be construed to be limited to answer supervision. It is known in the art that a foreign operator may place a call on hold while they try to obtain the requested information, which hold period may consume caller and domestic operator time and effort. In accordance with the principles of the present invention, the domestic operator may drop off the call during the call hold interval once it exceeds a predetermined duration. Consequently, the present invention may be extended to further comprise voice detection to detect the presence again on the line of the foreign operator. Then, as with answer supervision, the domestic operator may be signaled to rejoin the call in progress.

Also, automatic international services are known in a plurality of language and dialect alternatives. The customer may predetermine with AVP 330 what language the user prefers. Likewise, the foreign operator may receive announcements/prompts in a preferred language for their country or region of the country.

Thus, there has been shown and described an operator position system with answer supervision and a method for automatically ringing a remote directory assistance position which meets the objectives sought, especially saving operator time. In alternative embodiments of the invention, the caller's time and effort may be saved as well. All patents or patent applications referenced herein should be deemed to be incorporated as to their entire contents. The present invention should only be deemed to be limited in scope by the claims which follow.

What we claim is:

1. A method for completing a call to a remote directory assistance line from an operator service position attended by a live operator comprising the steps of attempting to place the call, disconnecting the operator service position from the call and supervising the call for remote answer and timing the period of answer supervision.

2. A method for completing a directory assistance call as in claim 1 further comprising the preliminary step of determining if the remote directory assistance line is associated with one of a country or region of a country eligible for said directory assistance call completion method.

3. A method for completing a directory assistance call as in claim 1 further comprising the preliminary step of receiving and storing data indicative of the remote directory assistance line.

4. A method for completing a directory assistance call as in claim 1 further comprising the step of announcing call data during the call.

5. A method for completing a directory assistance call as in claim 4 wherein said call announcement is provided after the expiration of a time-out interval.

6. A method for completing a directory assistance call as in claim 1 further comprising the step of detecting a remote answer.

7. A method for completing a directory assistance call as in claim 6 further comprising the step of connecting to an operator service position responsive to detection of a remote answer.

8. A method for completing a directory assistance call as in claim 7 further comprising the steps of receiving and storing data indicative of the remote directory assistance line and displaying the stored data to at the connected operator service position.

9. A method for completing a directory assistance call as in claim 6 wherein said connected operator service position comprises a free operator service position of an availability queue of free operator service positions or the first free operator service position.

10. A method for completing a directory assistance call as in claim 1 further comprising the step of reattempting to place the call after a predetermined period of time lapses.

11. A method for completing a directory assistance call as in claim 10 further comprising the steps of prompting the user for a callback time, storing said time in memory and placing a call to the user at the predetermined callback time.

12. A method for completing a directory assistance call as in claim 1 further comprising the steps of disconnecting the operator service position from the call in the event of an answer and subsequent indication of a call hold status and monitoring the call for voice detection.

13. A method for completing a directory assistance call as in claim 10 further comprising the step of counting the number of call attempts until a predetermined number is reached.

14. A method for completing a directory assistance call as in claim 13 further comprising the step of connecting the call to an operator service position when the predetermined number is reached.

15. A method for completing a directory assistance call as in claim 4 wherein said announcements are provided in a pre-selected language.

16. A method for completing a directory assistance call as in claim 15 further comprising the preliminary step of receiving language choice data from a caller.

17. A method for completing a directory assistance call as in claim 15 further comprising the preliminary step of receiving language choice data input by a remote directory assistance operator.

18. A method for completing a directory assistance call as in claim 1 further comprising the preliminary step of announcing the time of day in a region or country of a remote directory assistance position associated with the remote directory assistance line.

* * * * *